US 11,596,996 B1

(12) United States Patent
Harman (10) Patent No.: US 11,596,996 B1
(45) Date of Patent: Mar. 7, 2023

(54) DRIVE CLEAT NOTCHER WITH BENDER (71) Applicant: Rodney James Harman, Whistler (CA)

(72) Inventor: Rodney James Harman, Whistler (CA)

(*) Notice: Subject to any disclaimer, the term of this patent is extended or adjusted under 35 U.S.C. 154(b) by 543 days.

(21) Appl. No.: 16/738,959

(22) Filed: Jan. 9, 2020

Related U.S. Application Data (60) Provisional application No. 62/791,659, filed on Jan. 11, 2019.

(51) Int. Cl.
  *B21D 39/02* (2006.01)
  *B23D 29/02* (2006.01)
  *B23D 29/00* (2006.01)

(52) U.S. Cl.
  CPC ......... *B21D 39/025* (2013.01); *B23D 29/005* (2013.01); *B23D 29/026* (2013.01)

(58) Field of Classification Search
  CPC .... B21D 39/025; B23D 23/02; B23D 29/005; B23D 29/02; B23D 29/026; B26B 13/00; B26B 13/06
  USPC .......................................... 30/229, 263, 503
  See application file for complete search history.

(56) References Cited

U.S. PATENT DOCUMENTS

| 667,914 | A |   | 2/1901 | Klever, Jr. |   |
|---|---|---|---|---|---|
| 669,231 | A | * | 3/1901 | Carmody | B23D 29/02 30/229 |
| 1,531,287 | A | * | 3/1925 | Jensen | B23D 23/02 83/468.8 |
| 2,224,226 | A |   | 12/1940 | Jensen |   |
| 2,391,598 | A |   | 12/1945 | Serdich |   |
| 2,556,819 | A |   | 6/1951 | Musselwhite et al. |   |
| 2,595,841 | A |   | 5/1952 | Glick et al. |   |
| 2,603,864 | A | * | 7/1952 | Neola | B26B 13/06 30/233 |
| 2,690,009 | A |   | 9/1954 | Welk |   |
| 2,751,681 | A | * | 6/1956 | Hillson | B23D 23/02 30/229 |
| 3,014,275 | A | * | 12/1961 | Siravo | B26B 13/06 30/229 |
| 4,177,664 | A | * | 12/1979 | Spors | B21D 19/08 72/409.01 |
| 4,327,487 | A | * | 5/1982 | Brownell | B26B 13/06 30/229 |

(Continued)

OTHER PUBLICATIONS

Buy MBS, "HVACR Duct Tools from BuyMBS.com", "Malco Notcher Hand 1" (25.4 mm)" and "Malco Notcher Hand 13/16" (20.6 mm)", http://buymbs.com/c-291-duct-tools.aspx, accessed on Oct. 8, 2014, 1 page.

(Continued)

*Primary Examiner* — Hwei-Siu C Payer
(74) *Attorney, Agent, or Firm* — Dwayne Rogge (57) ABSTRACT

A hand-held drive cleat tool for the forming of sheet material such as drive cleats. The tool has a first handle; a second handle pivotably coupled to the first handle at a handle pivot; the handle pivot having a handle pivot axis; an inner jaw coupled to the first handle; the inner jaw having an inner jaw cutting edge substantially triangular in cross section in an inner jaw plane parallel to the handle pivot axis; an outer jaw coupled to the second handle, the outer jaw having an insert surface beveled in a cutting plane orthogonal to the inner jaw plane; the outer jaw having a surface defining an outer jaw cutting edge adjacent which the inner jaw cutting edge passes; and wherein rotation of the second handle relative to the first handle rotates the inner jaw relative to the outer jaw.

9 Claims, 6 Drawing Sheets

(56) References Cited

U.S. PATENT DOCUMENTS

| | | | |
|---|---|---|---|
| 4,353,240 A | | 10/1982 | Undin et al. |
| 4,513,502 A | * | 4/1985 | Gacek .................. B26D 3/14 |
| | | | 30/233 |
| 4,543,719 A | * | 10/1985 | Pardoe .................. E02F 3/965 |
| | | | 83/609 |
| 4,689,884 A | | 9/1987 | Chavarria |
| 5,483,746 A | | 1/1996 | Beyers |
| 5,487,745 A | * | 1/1996 | McKenzie ..... A61B 17/320016 |
| | | | 606/174 |
| 5,509,291 A | | 4/1996 | Nilsson et al. |
| 6,240,764 B1 | | 6/2001 | Geurts |
| 6,591,506 B2 | | 7/2003 | Hackman |
| 10,399,157 B1 | | 9/2019 | Harman |
| 2005/0166405 A1 | | 8/2005 | Lai |
| 2005/0198833 A1 | * | 9/2005 | Lin .................. B26B 29/04 |
| | | | 30/92 |
| 2018/0056409 A1 | | 3/2018 | Caglar et al. |

OTHER PUBLICATIONS

Drive Cleat Tool—Hillegas Enterprise, "Drive Cleat Tool, Our Story", http://drivecleatool.com/our-story/, 2018, 1 page.

Drive Cleat Tool, "Drive Cleat Tool New Products", http://drivecleatool.com/, Website accessed Mar. 18, 2018, 1 page.

Drive Cleat Tool, "HVAC Drive Cleat Tool, Sheet Metal Tool For Ductwork—$50 (Kent)", https://bellingham.craigslist.org/tls/d/hvac-drive-cleat-tool-sheet/6527, Website accessed Mar. 18, 2018, 2 pages.

Drive Cleat Tool, "HVAC Drive Cleat Tool, Sheet Metal Tool For Ductwork—$50 (Kent)", https://skagit.craigslist.org/tls/d/hvac-drive-cleat-tool-sheet/67406514, Website accessed Nov. 28, 2018, 1 page.

Menards, "Sidepin Sheet Metal Hand Notcher," http://www.menardsoc.com/main/heating-cooling/hvac-tools-accessories/sidepin-sheet-m . . . , accessed on Nov. 8, 2014, 1 page.

Rapid Materials, "Malco N1R Hand Notcher," https://www.rapidmaterials.com/products/notchers-for-sheet-metal?var . . . , accessed on Dec. 17, 2016, 2 pages.

Roper Whitney, "Pexto Hand Notchers," http://www.roperwhitney.com/portable-metal-notchers.html, accessed Oct. 8, 2014, 2 pages.

Roper Whitney, "Roper Whitney Sheet Metal Notchers," http://www.grainger.com/category/sheet-metal-notchers/punches-chisels-and-hand-drills/ . . . , accessed Oct. 8, 2014, 1 page.

Toolbarn, "Malco Tools Redline Hand Notcher," http://www.toolbarn.com/malco-n 1 r.htm, accessed Dec. 17, 2016, 1 page.

\* cited by examiner

DRIVE CLEAT NOTCHER WITH BENDER

RELATED APPLICATIONS

This application claims priority of U.S. Provisional Patent Application Ser. No. 62/791,659 filed on Jan. 11, 2019 incorporated herein by reference.

BACKGROUND OF THE DISCLOSURE

Field of the Disclosure

This disclosure relates to the field of hand-held tools for the forming of sheet materials. The disclosed tool is especially useful for the connecting of sections of air duct.

BRIEF SUMMARY OF THE DISCLOSURE

Disclosed herein is a drive cleat tool comprising in one example a hand-held drive cleat notcher with a bender (bending component). The drive cleat tool comprising in one example: a first handle; a second handle pivotably coupled to the first handle at a handle pivot; the handle pivot comprising a handle pivot axis; an inner cutting jaw coupled to the first handle; the inner cutting jaw comprising an inner jaw cutting edge substantially triangular in cross section in a plane parallel to the handle pivot axis; an outer cutting jaw coupled to the second handle, the outer cutting jaw having an insert surface beveled in a plane orthogonal to a cutting plane orthogonal to the pivot plane and orthogonal to the handle pivot; the outer jaw having a surface defining an outer jaw cutting edge adjacent which the inner jaw cutting edge passes; and wherein rotation of the second handle relative to the first handle rotates the inner cutting jaw relative to the outer cutting jaw.

The hand-held tool as recited herein may be arranged wherein the thickness of the insert surface in the cutting plane is less than 6 mm. The hand-held drive cleat tool may also be arranged wherein the thickness of the insert surface is less than 3 mm. The hand-held tool as recited herein may alternatively be arranged wherein the thickness of the insert surface is less than 1.5 mm.

The hand-held tool as recited herein may be arranged where in the inner jaw comprises: a proximal end adjacent the handle; a distal end; and wherein the proximal end of the inner jaw cutting edge passes the outer jaw cutting edge before the distal end of the inner jaw cutting edge passes the inner jaw cutting edge.

The hand-held tool as recited herein may be arranged wherein the inner jaw cutting edge is arcuate in cross section in the cutting plane.

The hand-held tool as recited herein may further comprise: a first shear blade coupled to the first handle and positioned between a first grasping portion of the first handle and the handle pivot; a second shear blade coupled to the second handle and positioned between a second grasping portion of the second handle and the handle pivot; wherein the first shear blade passes the second sheer blade in contact therewith as the first handle is rotated relative to the second handle.

The hand-held drive cleat tool as recited herein may further comprise a discard catch provided adjacent the outer jaw on the opposing side from the inner jaw and configured to receive cut portions removed from a cut material as the inner jaw cutting edge passes the outer jaw cutting edge and cuts the material.

The hand-held tool as recited herein may also be configured to simultaneously cut two non-parallel and non-connected edges of a material.

The hand-held tool as recited may also be arranged wherein the outer jaw is configured to be inserted into gaps between a back plate and a pair of offset and flanges parallel to the back plate of a material such as a drive cleat without substantial deformation of the back plate or flanges.

The hand-held tool as recited herein may be arranged wherein; the inner jaw is coupled to the outer jaw at a combined jaw pivot parallel to and offset from the handle pivot; the inner jaw is coupled to the first handle at an inner jaw pivot parallel to and offset from the handle pivot and the combined jaw pivot; and the outer jaw is coupled to the second handle at an outer jaw pivot parallel to and offset from the handle pivot; and inner jaw pivot.

DETAILED DESCRIPTION OF THE DISCLOSURE

This disclosure relates to a hand-held tool 20 for the forming of sheet materials. The hand-held tool 20 particularly well adapted for forming of air duct connectors such as drive cleats 22 shown in FIG. 9. In one application the hand-held tool 20 is particularly useful in the heating, ventilation, and air conditioning (HVAC) industry where drive cleats 22 and similar devices are often operated used to connect sections of air duct and fittings. The tool 20 can be operated by users (trades persons, assistants, installers, etc.) to open, cut (notch), bend, and otherwise form components of an air duct system. The tool 20 is specifically useful to install square and rectangular ducting and duct fittings (See FIG. 12). In one common example, the components of the air duct system are formed of sheet metal. As is obvious to one of ordinary skill in the art, the tool 20 may be used to open, cut, notch, bend, and drive or tap the components such as the drive cleats 22.

Figure 12:
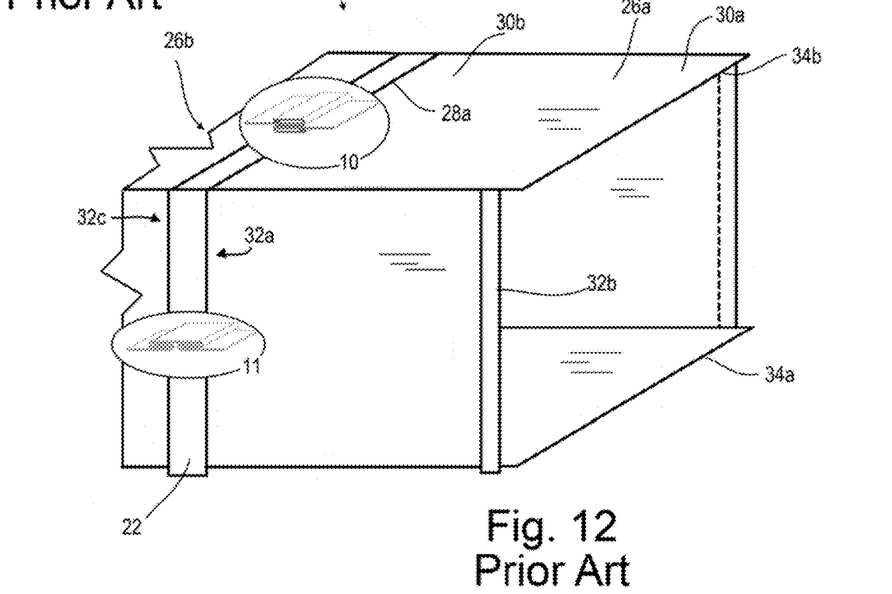
FIG. 12 is a perspective view of prior art duct sections being coupled together using s-cleats and drive cleats.
Figure 13:
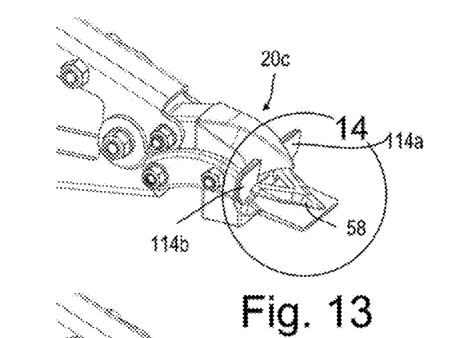
FIG. 13 is a perspective view of another example of the disclosed hand-held drive cleat notcher with a bending component.
Figure 14:
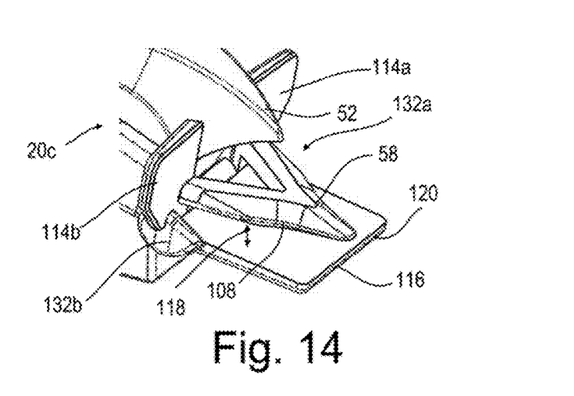
FIG. 14 is an enlarged view of the region 14 of FIG. 13.
Figure 15:
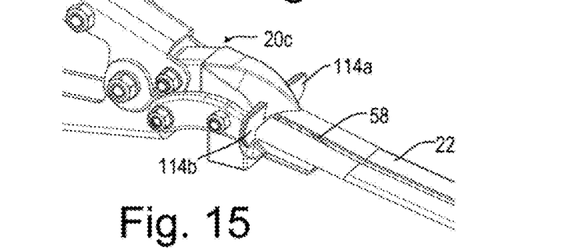
FIG. 15 shows the tool of FIG. 13, in preparation to notch a drive cleat.
Figure 16:
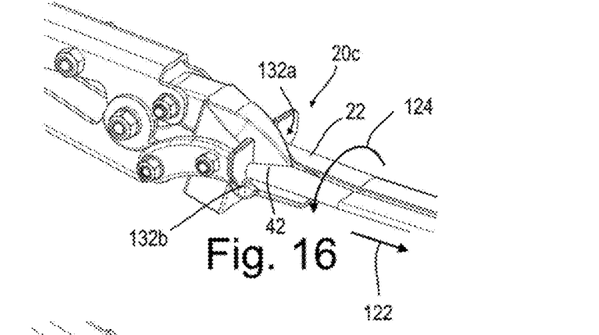
FIG. 16 shows the tool of FIG. 13, used to notch a drive cleat.

When producing (forming, assembling, and installing) sheet (metal) constructions 24, such as air ducts 26 (26a and 26b) for channeling air; or similar constructions made of other materials, many different components may be used. A typical ducting 26 used in production of HVAC systems comes in square or rectangular cross-sectional profiles as shown in FIG. 12. This form of ducting has been around for more than 100 years and continues to be used in many residential and commercial buildings. Such rectilinear-sided ducting installation often requires the user to join (connect) the duct sections 26a, 26b or other components together with fittings and/or fasteners.

To abbreviate this disclosure and aid in description, in this disclosure, general numeric labels such as "26" may be used to denote a component, such as the ductwork 26, where an alphabet suffix (a and b) denote specific examples (e.g. the duct 26, 26a, 26b). This labeling system is used to make the disclosure clearer where similar labels denote similar or equivalent components.

Figure 8:
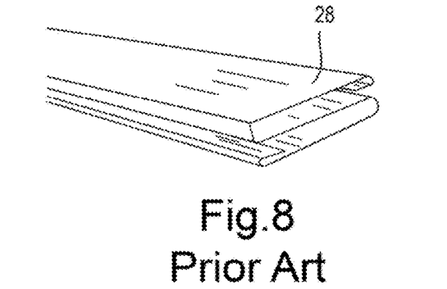
FIG. 8 is a perspective end view of a prior art s-cleat.
Figure 9:
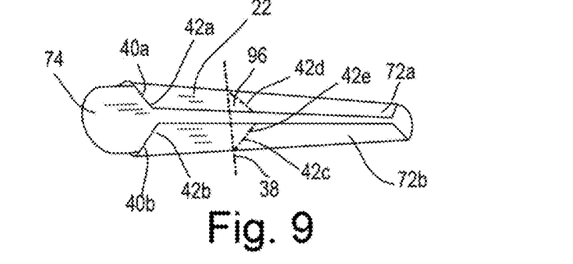
FIG. 9 is a perspective end view of a prior art drive cleat.

Two common structures used to connect sections of flat-sided duct together are S-cleats 28 (FIG. 8) & drive cleats 22 (FIG. 9). In one example (FIG. 8), the end view of an S-cleat appears as a flattened "S". In one example (FIG. 11) the profile of a drive cleat 22 looks like a flattened "C" in cross-section or end view.

Figure 10:
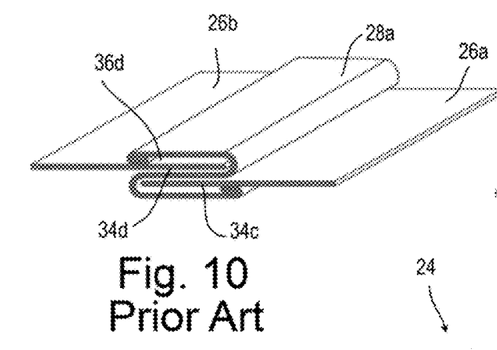
FIG. 10 is a perspective end view of a prior art s-cleat in use coupling two duct sections together.
Figure 11:
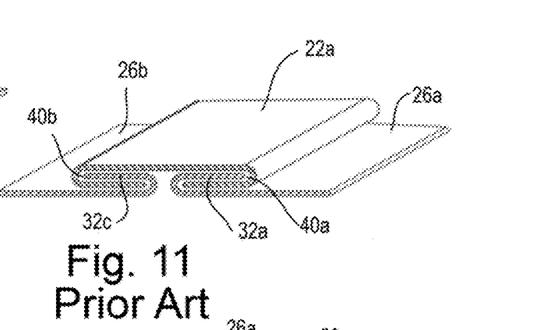
FIG. 11 is a perspective end view of a prior art drive cleat in use coupling two duct sections together.
Figure 19:
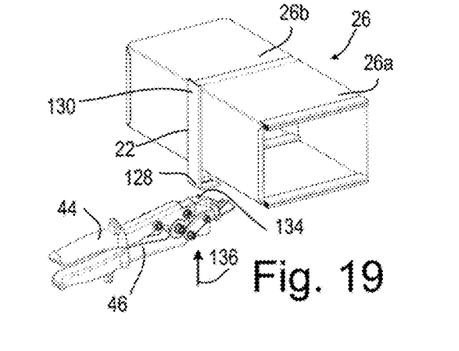
FIG. 19 shows the tool of FIG. 13 used to install a drive cleat.

When connecting sections 26a, 26b of duct 26 with drive cleats 22 (FIG. 9); each connecting end 30a and 30b of the duct 26a may comprise folded drive cleat hems 32a and 32b on opposing sides thereof, as shown in FIGS. 10, 11, 12. Adjacent duct section of duct 26b may have similar hems, including hem 32c as seen in FIG. 11. The drive cleat hems 32 may be formed at the job site (where the construction or duct assembly 24 is installed in a building) although it is more common to produce these hems 32 off-site, during construction of the ductwork sections 26. These drive cleat hems 32 accept the s-cleats 28, drive cleats 22, and lock adjacent two duct sections 26 together as shown in FIG. 11. In one example adjacent duct sections 26 are connected by sliding the drive cleat 22 along the adjacent hems 32 into position as shown in FIG. 19.

Some drive cleats 22 comprise a v-shaped notch 42 on the installation end thereof to facilitation insertion over the hems 32. The v-shaped notch 42 facilitates initial insertion of the drive cleat 22 along the hems 32 as is known in the art by providing a tapered opening, thus avoiding a flat surface to flat surface contact between the drive cleat 22 between the duct sections 26 insertion of the hems 32 into the drive cleat 22 is more easily achieved. In one example, the alternate edges 34 of each duct section 26 accept the S-Cleats 28 for attachment prior to attachment of the drive cleats 22.

Joining two adjacent sections of duct 26a, 26b together as shown in FIG. 10; the user may position an S-cleat 28a onto the end 34c of the duct 26a. The end 34d of the adjoining duct 26b is positioned into the open gap 36d of the S-cleat 28a. The ducts 26a and 26b are thus joined and partially sealed together, albeit loosely.

With the ducts 26a and 26b thus joined together; drive cleats 22 may be used to lock the sections of duct 26a and 26b together on alternate edges 32a and 32b of the construction 24 from the sides 34a and 34b utilizing the S-cleats 28.

When a drive cleat 22 is cut 38 to length using known methods and tools, cutting with snips, or similar pinching or scissor-like tools commonly compresses (closes) the two gaps 40a and 40b at the cut end of the drive cleat 22. To aid in installation, the gaps 40 at one end of each drive cleat are opened from this compressed position by an installer to open the closed gaps, shaped, and notched (e.g. cuts 42a, 42 made, forming the notch 42) for ease of installation. The procedure to prepare the drive cleats 22 before they are installed onto the hemmed end 32 of the duct 26 is accomplished based on the experience of the user.

In one prior known use of these drive cleats 22, an installer may utilize a flat (standard) screw driver or equivalent tool to open the gaps 40 (40a, 40b) on the end of the drive cleat 22 which were crimped closed during a cutting or other process; then with sheet metal snips or equivalent cutting devices, the user makes two cuts 42a. 42b that substantially form a V-shaped notch 42.

In another prior known methods of using drive cleats 22, the user may use the point of metal shears/sheet metal snips to open the gaps 40 of the drive cleat 22 and with the same metal shear tool, make two cuts 42a 42b that form the V-notch 42 in the end of the drive cleat 22.

Both of these prior known practices work to some extent; however, these practices are time consuming, and with no guarantee of a clean profile drive cleat 22 end, nor clean v-notch 42 for ease of connection. There is also the likelihood of injury to installers when using these methods in that a flat screwdriver, the point of cutting snips, or other devices to open, shape, and cut the notch 42 in the drive cleat 22. In addition, use of metal snips in this way improperly opens the gaps 40, as the blades of the metal snips require spreading of the gap 40 far beyond the resiliency of the materials commonly used.

The disclosed device in one example is a specially designed drive cleat tool 20. The drive cleat tool 20 in one example configured to both open, shape, notch, and bend a drive cleat or similar article. The drive cleat tool 20 in one example utilizes a novel structure allowing a novel method of opening, shaping, bending, and notching a V-shaped notch in drive cleat and other material. In one example, these operations can be accomplished without changing tools, and with little or no adjustment of the user's grip on the drive cleat tool 20 as these operations change. The disclosed hand operated drive cleat tool 20 is relatively small and lightweight compared to bench or floor mounted tools often used to manufacture such drive cleats 22. Thus, the disclosed tool 20 may conveniently be carried by the user on the jobsite, up ladders, and in any space the installer can reach into.

The disclosed hand operated tool in one example is made of several parts, many of them comprised of a composite of zinc plated mild steel, drop forged high impact alloy steel. In one example the drive cleat tool 20 is formed with easy-grip handle covers. In one example the drive cleat tool 20 in one example has a lower female base anvil or outer jaw 58 and an upper or inner jaw 52 at an end of the drive cleat tool 20 opposite the handles 44, 46.

There are numerous companies that manufacture notching tools with a limited operating range. These tools in most examples are only capable of cutting a notch on flat (unfolded) sections of material, where both sides of the material to be cut are easily reached.

This limited range of notching is due to the height of their lower female base anvils. The proposed tool overcomes this deficiency with a spearhead point on the lower female base anvil or outer jaw 58. The spearhead point is in front of the V-shaped cutting section of the tool. Currently, there is no known sheet metal tool on the market that can cut a drive cleat to length, then open, shape, cut a "V" notch in formed drive cleat material and bend the drive cleat.

The disclosed drive cleat tool 20 in one example 20b is optionally designed to cut a drive cleat 22 to length. In at least one example, the tool 20b is capable to then make a clean opened-notched profile in the end of the drive cleat. As previously mentioned, prior known cutters generally closed the gaps 40 and flattening the drive cleat 22 at the cut 38. In one method of operation, with the tool 20 in hand; the installer then inserts and pushes the outer jaw 58 into the end gaps 40 of the drive cleat 22. With the outer jaw 58 designed as shown, this insertion action opens and shapes the end of the (previously flattened) drive cleat 22. With the outer jaw 58 still in place in the drive cleat 22, the installer then squeezes the handles 44/46 thus producing the V-notch cuts 42a and 42b forming the V-notch 42. These actions utilizing the tool 20 open the gaps 40, shape and cut the V-notch 42 in the end of the drive cleat 22 with a single insertion action. The improved (v-notch 42 and opened gaps 40) end profile of the drive cleat 22 allows for a quick, easy, accurate, and safe duct connection as shown in FIG. 12.

The tool 20 in one example is a hand-held tool opening, shaping and cutting a V-shaped notch in drive cleat 22. In one example the tool 20 is particularly well suited for use in the HVAC industry.

The hand-held tool 20 in one example comprises: a first handle 44; a second handle 46 in one example pivotably coupled to the first handle 44 at a handle pivot 48. Thus, the handles 44, 46 may be rotated about the handle pivot 48 when grasped and compressed by a user. The handle pivot 48 comprising a handle pivot axis 50 about which the handles rotate.

The tool 20 in one example also comprising an inner jaw 52 coupled to the first handle 44. The inner jaw 52 configured to move when the first handle 44 is rotated about the handle pivot 48. In one example, the inner jaw 52 comprising an inner jaw cutting edge 54 substantially triangular in cross section in an inner jaw plane 56. The handle pivot axis 50 lying in the inner jaw plane 56.

Figures 24, 25, 26, 27:
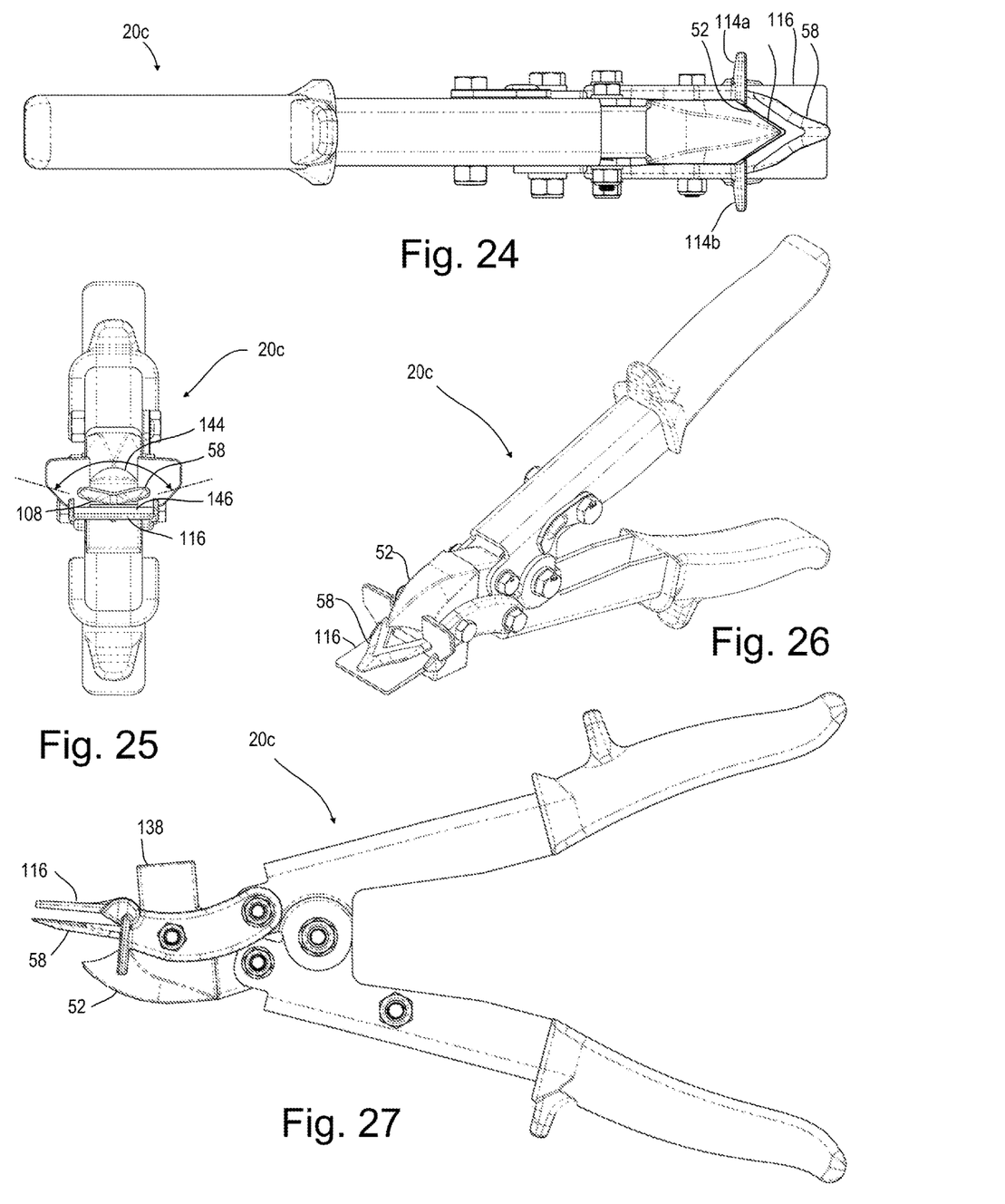
FIG. 24 is a top view of the example tool shown in FIG. 13.
FIG. 25 is a front view of the example tool shown in FIG. 13.
FIG. 26 is a perspective view of the example tool shown in FIG. 13.
FIG. 27 is a second side view of the example tool shown in FIG. 13 from the opposing side.

In addition, an outer jaw 58 is provided, in one example coupled to the second handle 46 and configured to move when the second handle 46 is rotated relative to the first handle 44. In one example, the outer jaw 58 has an insert surface 60 in one example with a bevel 62 in a cutting plane 64 orthogonal to the inner jaw plane 56, and orthogonal to the handle pivot axis 50. The beveled surface 62 in one example inclined from the most forward leading edge first inserted into a drive cleat or equivalent, and a following edge rearward therefrom. The beveled surface 62 configured so as to wedge the gaps 40 of the drive cleat 22 open during insertion of the outer jaw 58 into the drive cleat 22. This beveled surface 62 may be upwardly beveled from the bottom edge 108 toward the cutting edge 68 as shown or may alternatively be reversed and beveled in the opposing direction. In the example of FIG. 25, the lower surface 108 is also or alternatively angled 144 in a convex configuration. This convex configuration may also be beveled to increase ease of use of the tool 20. The bevel 62 may be planar, substantially planer, arcuate, or a combination thereof. The outer jaw 58 in one example having a surface defining an outer jaw cutting edge 68 adjacent which the inner jaw cutting edge 54 passes. In one example, the outer jaw cutting edge 68 rubs against the inner jaw cutting edge 54 in a scissor-like action to form a cutting edge. In this configuration, rotation of the second handle 46 relative to the first handle 44 rotates the inner jaw 52 relative to the outer jaw 58.

The hand-held tool 20 as recited herein may be arranged wherein the thickness 70 of the insert surface 60 measured in the cutting plane 64 is less than 6 mm so as to fit within the relatively narrow gaps 40 between the flanges 72 and the back plate 74 of the drive cleat 22 or equivalent structure. The hand-held drive cleat tool 20 may also be arranged wherein the thickness 70 of the insert surface is less than 3 mm for narrower gaps 40. The hand-held tool 20 as recited herein may alternatively be arranged wherein the thickness 70 of the insert surface 60 is less than 1.5 mm for even narrower gaps 40.

The hand-held tool 20 as recited herein may be arranged where in the inner jaw 52 comprises a proximal end adjacent the first handle 44, and a distal end 80.

To improve the cutting action, in one example a distal end 80 of the inner jaw cutting edge 54 engages the outer jaw cutting edge 68 before a proximal end 112 of the inner jaw cutting edge passes the outer jaw cutting edge 68. This configuration helps to prohibit wedging out of the material 82 as the material, (e.g. drive cleat 22) is being cut/notched.

Figure 7A:
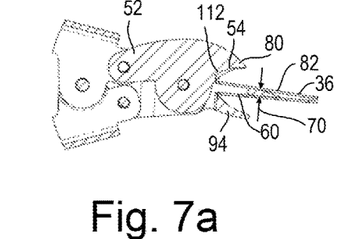
FIG. 7a is a cutaway view of the region 7 of FIG. 6 taken along line 7-7 of FIG. 4 in a first stage of cutting a notch in a material.
Figure 7B:
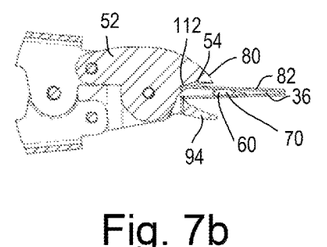
FIG. 7b is a cutaway view of the region 7 of FIG. 6 taken along line 7-7 of FIG. 4 in a second stage of cutting a notch in a material.
Figure 7C:
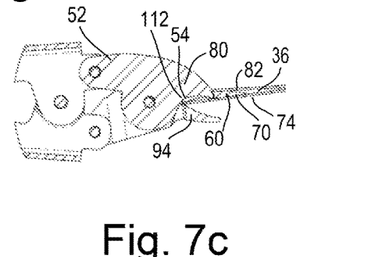
FIG. 7c is a cutaway view of the region 7 of FIG. 6 taken along line 7-7 of FIG. 4 in a third stage of cutting a notch in a material.

In another example, shown in FIG. 7a-7c the proximal end 112 of the inner jaw cutting edge 54 engages the outer jaw cutting edge before the distal end 80 of the inner jaw cutting edge passes the outer jaw cutting edge. This configuration hinders the distal end 80 from deforming the material 82 as the distal end 80 approaches the back plate portion 74 of the drive cleat 22 or equivalent.

Figure 3:
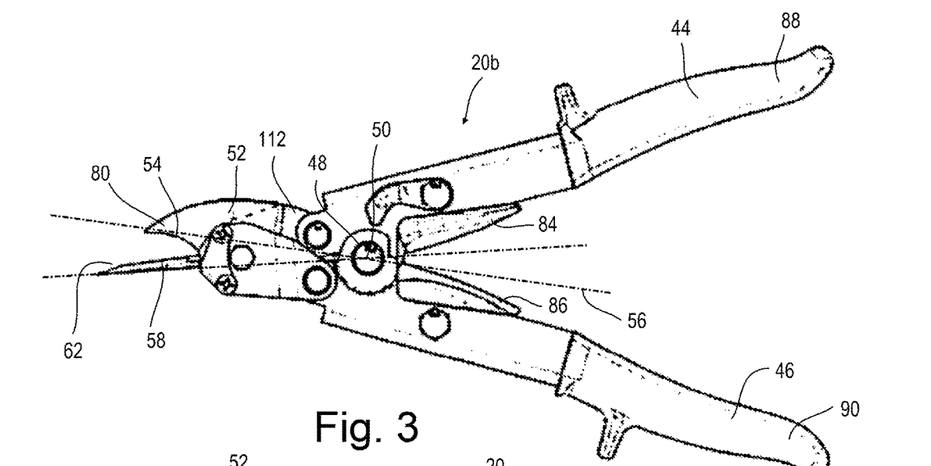
FIG. 3 is a side view of the hand-held tool shown in FIG. 2.
Figure 4:
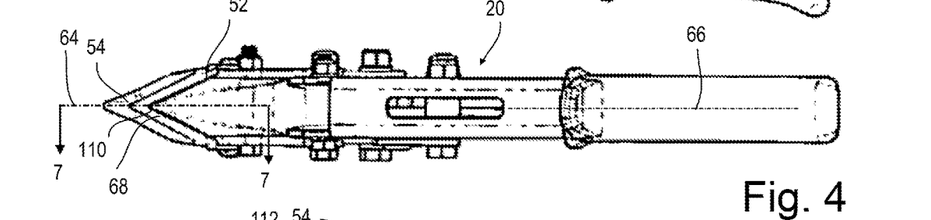
FIG. 4 is a top view of the hand-held tool shown in FIG. 2.

The hand-held tool 20 as recited herein may be arranged wherein the inner jaw cutting edge 54 is arcuate in cross section in the cutting plane 64. This arcuate cutting edge 68 is shown in FIG. 3 very clearly. Such an arcuate inner jaw cutting edge 54 facilitates a cutting action from the distal end 80 toward the proximal end or in another example in the opposing direction. In the first example, cutting from the distal end 80 to the proximal end as a two-point scissor-like cut on either lateral side of the cutting edge 68. This action helps to prevent the material 82 from "wedging" out of the tool 20 when being cut. This configuration also reducing the cutting pressure needed to cut relative to flat punch style tools that cut along a line rather than point contact which may be desired in some examples. In one example, it may be desired that no portion of the inner jaw passes the lower edge 108 of the outer jaw 58 where the inner jaw may otherwise deform the back plate 74.

Figure 5:
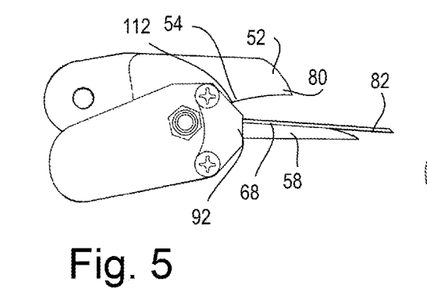
FIG. 5 is a side view of the inner jaw and outer jaw components of the hand-held tool shown in FIG. 2 in an open position.
Figure 6:
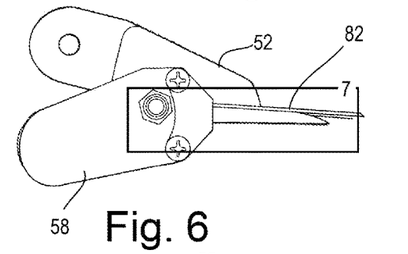
FIG. 6 is a side view of the inner jaw and outer jaw components of the hand-held tool shown in FIG. 2 in a closed position.

The hand-held tool 20 as recited herein may be arranged with cutting action from the proximal end 112 toward the distal end 80 as shown in FIG. 5. In this configuration. Cutting is accomplished as a two-point cut on either lateral side of the cutting edge 68. This action helps to prevent damage to the material 82 being cut. This design also reducing the cutting pressure needed to cut, relative to flat punch style tools that cut on a line rather than single point contact, as scissors cut. In such an example, it may be desired that no portion of the inner jaw passes a lower edge 108 of the outer jaw 58 where it may deform the back plate 74.

In addition, the drive cleat tool 20 may utilize a stop surface 92 against which the material 82 abuts when fully inserted between the cutting edges 68/54. This stop surface 92 in the example of FIG. 5 is a portion of the outer jaw 58 and configured to form a proper notch 42c adjacent a cut 38 in the material 82 such as the drive cleat 22 shown.

The hand-held drive cleat tool 20 in one example as recited herein may further comprise a first shear blade 84 coupled to the first handle 44 and positioned between a first grasping portion 88 of the first handle 44 and the handle pivot 48. Also disclosed is a second shear blade 86 coupled to the second handle 46 and positioned between a second grasping portion 90 of the second handle 46 and the handle pivot 48. In one example, the first shear blade 84 passes the second sheer blade 86 in contact therewith as the first handle 44 is rotated relative to the second handle 46. This arrangement allows the cut 38 or equivalents to be made in the material 82 such as an s-cleat 28 or drive cleat 22 without utilizing a second (cutting) tool.

Figure 1:
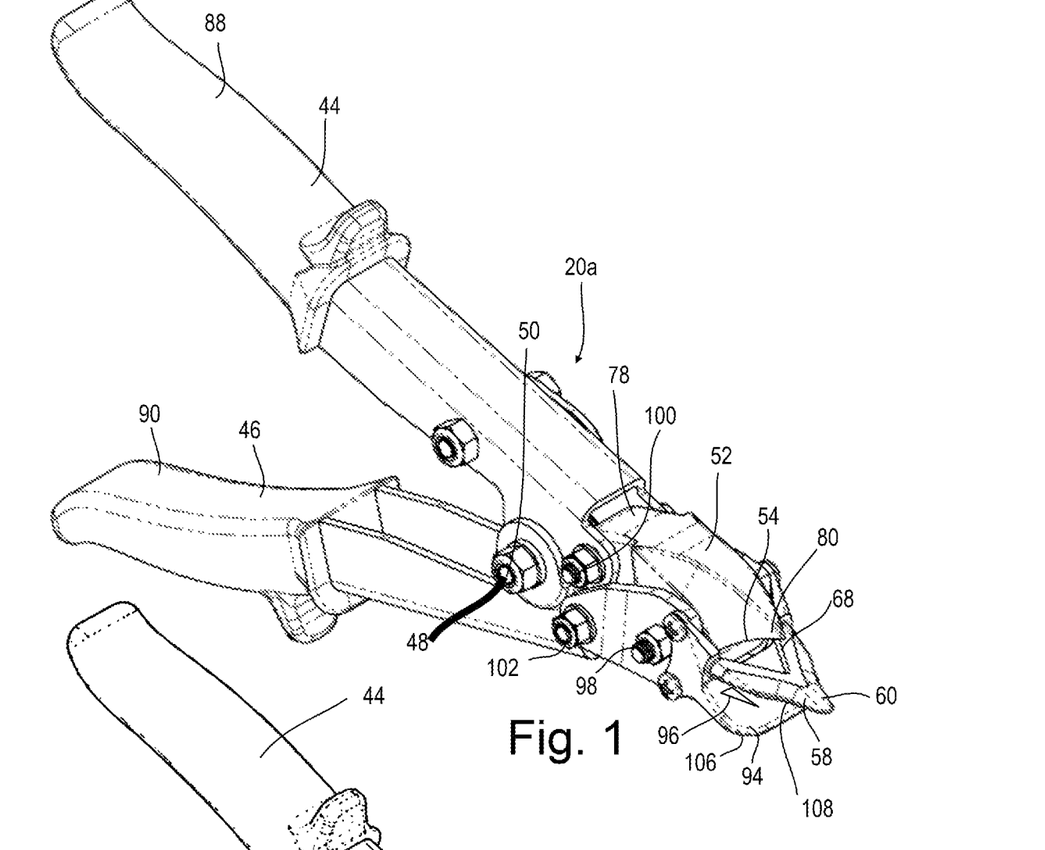
FIG. 1 is as perspective view of one example of the disclosed hand-tool with a discard catch.
Figure 2:
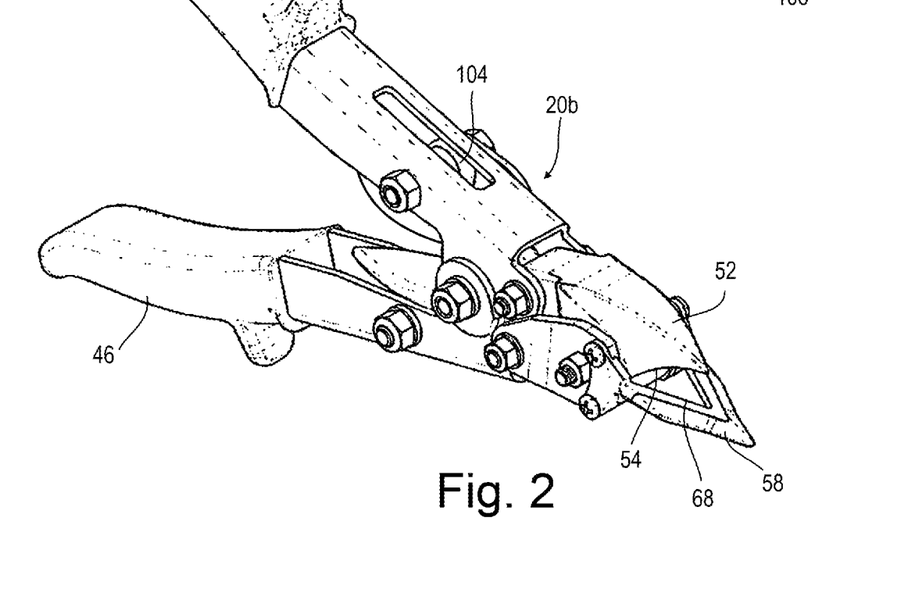
FIG. 2 is a perspective view from a different angle of the hand-held tool shown in FIG. 1 with a shear cutting assembly.

The hand-held tool-20 may be arranged in one example with a discard catch 94 provided adjacent the outer jaw 58 on the opposing side from the inner jaw 52. The discard catch 94 configured to receive cut portions removed 96 (discards shown in FIG. 1) from a cut material 82 as the inner jaw cutting edge 54 passes the outer jaw cutting edge 68 and cuts (removes) the notch 42 or equivalents. The catch 94 is particularly useful when working with the tool overhead or in other areas where the discards 96 may provide a health, safety, or other hazard. In the example shown, the catch is a semi-enclosed component, having an open region facing the cutting edge 68 and enclosed elsewhere to catch and retain the discards 96.

The catch 94 also is a safety feature, stopping the material 22 from passing below the outer jaw 58 if the outer jaw 58 passes the material 22. In such a position, the material 22 potentially having a sharp or otherwise damaging end, may contact the user's hand, for example the hand grasping the handle 46. With the catch 94 as shown, the material 22 is likely to contact the forward edge 106 instead of passing rearward of thereof and potentially causing damage or injury to the user.

The hand-held tool 20 as recited herein may be configured to simultaneously cut two non-parallel and non-connected edges 42d, 42e of a material 82 (e.g. the drive cleat 22 shown in FIG. 9) after the cut 38 is made in the drive cleat 22.

The hand-held drive cleat tool 20 as recited herein may also be arranged wherein the outer jaw 58 is configured to be substantially thin so as to be inserted into gaps 40 between a back plate 74 and a pair of flanges 72 substantially parallel to and offset from the back plate 74. As the cutting action to produce the cut 38 is commonly detrimental to the drive cleat 22 or equivalent, properly spacing of the gaps 40 subsequent to or simultaneously with forming the edges 42d and 42e properly forms the notch 42c of the cut drive cleat 22 for installation.

The hand-held drive cleat tool 20 as recited herein may be arranged wherein; the inner jaw 52 is coupled to the outer jaw 58 at a combined jaw pivot 98 parallel to and offset from the handle pivot 48. In one example, the inner jaw 80 may be coupled to the first handle 44 at an inner jaw pivot 100 parallel to and offset from the handle pivot 48 and the combined jaw pivot 98. Similarly, the outer jaw 58 may be coupled to the second handle 46 at an outer jaw pivot 102 parallel to and offset from the handle pivot 48, combined jaw pivot 98, and inner jaw pivot 100.

In one example, the tool 20 comprises a return spring 104 which biases the first handle 44 away from the second handle 46. This biasing of the handles facilitating operation of the tool 20 and increasing efficiency in some examples as the user need not force open the tool 20 for use other than by relaxing the user's grip releasing the first handle 44 away from the second handle 46.

Looking to FIG. 13-20 is shown another example of a drive cleat tool 20c comprising the handles 44/46, inner jaw 52, outer jaw 58 of the previous examples with modifications near the cutting jaws. The optional shear blades 84/86 are not shown and may be implemented with this example.

The example drive cleat tool 20c includes a plurality of wings 114 (114a, 114b) fixed to the outer jaw 58 or inner jaw 52 and projecting laterally outward therefrom to protect an installer from accidental contact with the edges of the drive cleat 22 as the installer is positioning the drive cleat onto the outer jaw 58 when the drive cleat 22 is positioned be notched 42. Looking to FIG. 15, FIG. 16 it can be seen that as the drive cleat 22 is being paced onto the outer jaw 58, without the wings 114, should the installer misalign the drive cleat 22, it may be forced rearward into the hand of the installer about the handles 44/46 potentially causing injury. The wings 114 substantially reduce the likelihood of such injury as the drive cleat 22 will contact the wings 114 instead of the installer.

The tool 20c also comprising in one example a bending jaw 116 replacing the discard catch 94. The bending jaw 116 immediately below the outer jaw 58 with a gap 118 substantially the thickness of the drive cleat 22 between the bending jaw 116 and the lower edge 108 of the outer jaw 58. The bending jaw 116 having a distal bending edge 120 about which the drive cleat is bent, as will be described. The bending jaw 116 having an upper surface 146 which is optionally planar and offset from the lower edge 108 of the outer jaw.

Figure 17:
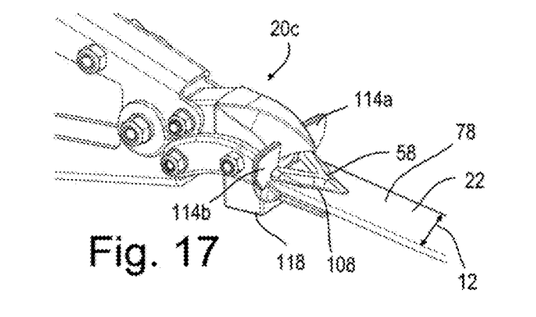
FIG. 17 shows the tool of FIG. 13 in preparation to bend a drive cleat.
Figure 18:
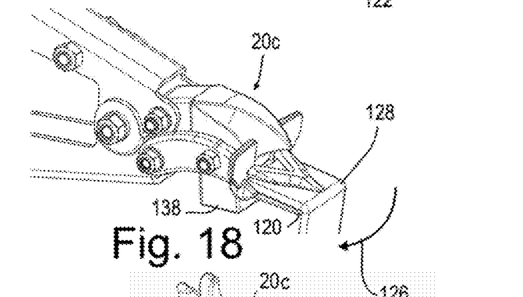
FIG. 18 shows the tool of FIG. 13 in use to bend a drive cleat.

In use, the installer can use the tool 20c as previously described above to notch the drive cleat 22 with a v-shaped notch 42 to ease in installation of the drive cleat onto the ductwork 26. The installer may then longitudinally 122 remove the drive cleat 22 from the outer jaw 58 and rotate the drive cleat 180° in direction 124 about the longitudinal axis relative to the drive cleat tool 20c and reposition the drive cleat 22 end for end. The opposing longitudinal end of the drive cleat 22 is then repositioned into the gap 118 as shown in FIG. 17. In one example, winglets 132a and 132b are provided on opposing sides of the outer jaw 58. These winglets 132 laterally align the drive cleat 22 in the gap 118 to ensure correct positioning. In this position the back plate 74 is pressed against the lower edge 108 of the outer jaw 58, and the wings 114 prohibit further movement of the drive cleat 22 toward the handles 44/46 which may otherwise injure the installer.

In this position, the drive cleat is pressed in direction 126 about the bending edge 120, forming a bend 128 in the drive cleat 22. The opposing end 130 of the drive cleat 22 is then inserted about the hems 32 as previously described and slid into position.

Where additional force is needed to install the drive cleat 22, a drive face 134 of the tool 22c may be used to tap the drive cleat 22 as shown in FIG. 19 in direction 136.

Figure 20:
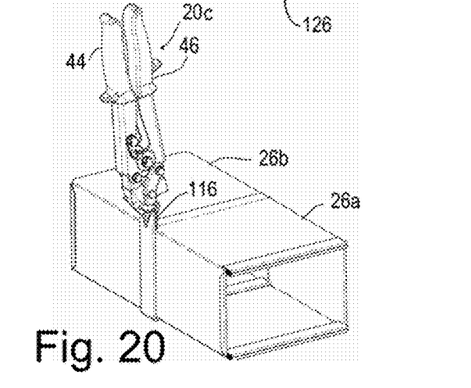
FIG. 20 shows the tool of FIG. 13 used to bend an installed drive cleat.

Once the drive cleat 22 is fully seated on the ductwork 26, the inserted end of the drive cleat 22 can be bent 140 over against the s-cleat 28a or other structure. FIG. 20 for example shows the drive cleat 22 inserted between the bending bar 116 and the outer jaw 58 in preparation for bending the drive cleat 22. This is accomplished much as shown in FIG. 17.

Figure 22:
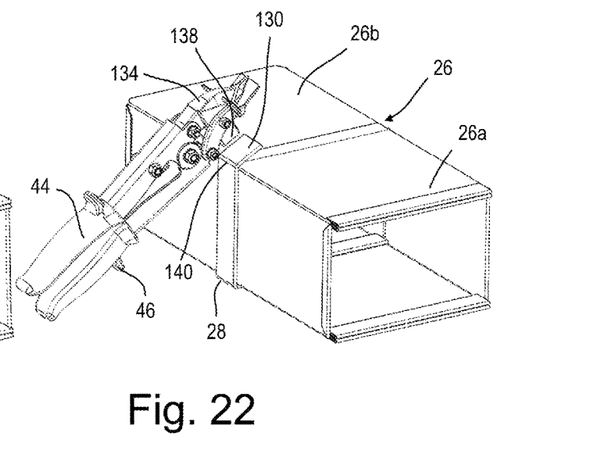
FIG. 22 shows the tool of FIG. 13 used to install a drive cleat in a later stage of installation.
Figure 23:
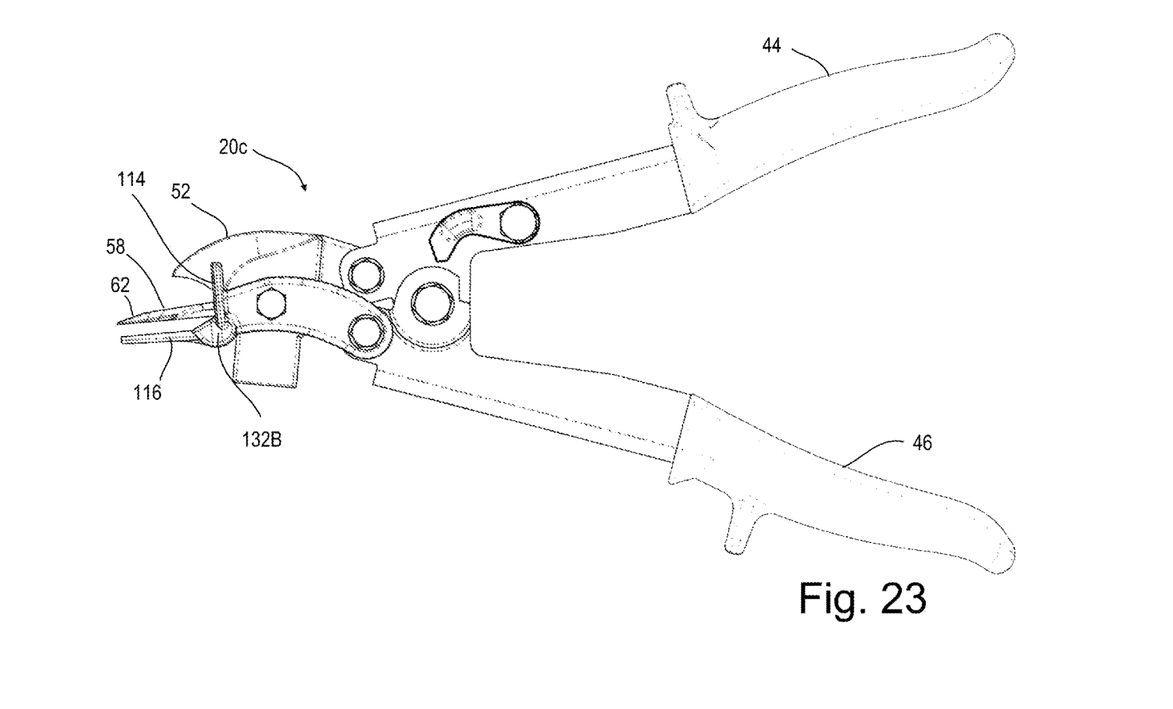
FIG. 23 is a first side view of the example tool shown in FIG. 13.

Once the drive cleat 22 is in position as shown in FIG. 20, the drive cleat may be bent around the bending jaw 116 by forcing the handles 44-46 toward the ductwork 26. This action forming the bend 140 shown in FIG. 22.

Figure 21:
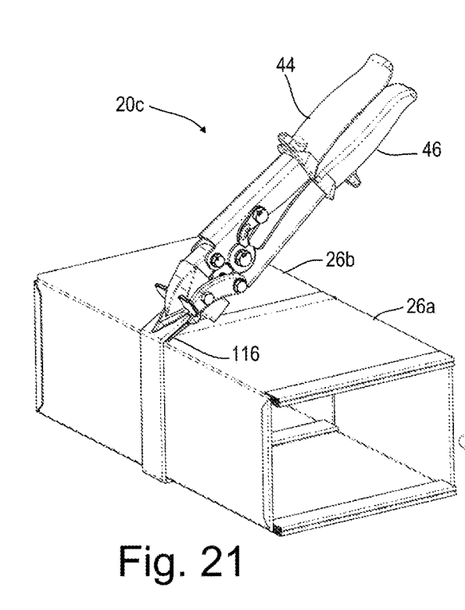
FIG. 21 shows the tool of FIG. 13 used to install a drive cleat.

Once the drive cleat is in position as shown in FIG. 20, or after partially bent 140 as shown in FIG. 21, the first drive face 134 or the second drive face 138 may be used to strike the end 130 of the drive cleat in direction 136. This action forming a bend 140 locking the drive cleat 22 in place. In one example, easily seen in FIG. 27, the drive face 138 extends from the other components of the tool 20 and may be a monolithic construction with the inner jaw 52. Monolithic meaning formed of one structure without seams.

In another example, only one drive face 134/138 may be provided and this drive face used interchangeably. One advantage of having drive faces on opposing sides of the tool 20 is that the tool need not be rotated from installing the drive cleat 22 to locking the drive cleat 22 in position.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A hand-held notching tool comprising:
   a first handle;
   a second handle pivotably coupled to the first handle at a handle pivot;
   the handle pivot comprising a handle pivot axis;
   an inner jaw coupled to the first handle;
   the inner jaw comprising an inner jaw cutting edge substantially triangular in cross section in an inner jaw plane plane parallel to the handle pivot axis;
   an outer jaw coupled to the second handle, the outer jaw having an insert surface beveled in a cutting plane orthogonal to the inner jaw plane;
   the outer jaw having a surface defining an outer jaw cutting edge adjacent which the inner jaw cutting edge passes;
   wherein rotation of the second handle relative to the first handle rotates the inner jaw relative to the outer jaw, passing the inner jaw cutting edge past the outer jaw cutting edge;
   a bending jaw coupled to the second handle;
   wherein the bending jaw extends offset and parallel to the outer jaw; and
   wherein the bending jaw comprising a bending edge offset from a lower edge of the outer jaw.

2. The hand-held notching tool as recited in claim 1 wherein the thickness of the insert surface in the cutting plane is less than 6 mm.

3. The hand-held notching tool as recited in claim 2 wherein the thickness of the insert surface is less than 3 mm.

4. The hand-held notching tool as recited in claim 3 wherein the thickness of the insert surface is less than 1.5 mm.

5. The hand-held notching tool as recited in claim 1 wherein the inner jaw cutting edge comprises:
   a proximal end adjacent the first handle;
   a distal end;
   wherein the proximal end of the inner jaw cutting edge passes the outer jaw cutting edge before the distal end of the inner jaw cutting edge passes the outer jaw cutting edge.

6. The hand-held notching tool as recited in claim 5 wherein the inner jaw cutting edge is arcuate in cross section in the cutting plane.

7. The hand-held notching tool as recited in claim 1 wherein;
   the inner jaw is coupled to the outer jaw at a combined jaw pivot parallel to and offset from the handle pivot;
   the inner jaw is coupled to the first handle at an inner jaw pivot parallel to and offset from the handle pivot and the combined jaw pivot; and
   the outer jaw is coupled to the second handle at an outer jaw pivot parallel to and offset from the handle pivot and the inner jaw pivot.

8. The hand-held notching tool as recited in claim 1 wherein the bending jaw comprises a planar upper surface substantially parallel to an adjacent lower edge of the outer jaw.

9. The hand-held notching tool as recited in claim 1 wherein rotation of the second handle relative to the first handle rotates the inner jaw relative to the outer jaw, passing the inner jaw cutting edge past the outer jaw cutting edge to cut material in a two-point cutting action on either lateral side of the outer jaw cutting edge.

* * * * *